US009087237B2

(12) United States Patent
Shimizu

(10) Patent No.: US 9,087,237 B2
(45) Date of Patent: Jul. 21, 2015

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventor: Tomoyuki Shimizu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 13/785,196

(22) Filed: Mar. 5, 2013

(65) Prior Publication Data

US 2013/0251198 A1 Sep. 26, 2013

(30) Foreign Application Priority Data

Mar. 26, 2012 (JP) ................................. 2012-070187

(51) Int. Cl.
G06K 9/00 (2006.01)
H04N 5/232 (2006.01)
H04N 5/235 (2006.01)
H04N 5/225 (2006.01)
G06K 9/32 (2006.01)
G06T 7/00 (2006.01)
G06T 5/00 (2006.01)

(52) U.S. Cl.
CPC ........ G06K 9/00536 (2013.01); G06K 9/00255 (2013.01); *H04N 5/2258* (2013.01); *H04N 5/2356* (2013.01); *H04N 5/23219* (2013.01)

(58) Field of Classification Search
CPC .......... G06K 9/00624; G06K 9/00677; G06K 9/3241; G06T 7/004; G06T 7/0069; G06T 5/003
USPC .................................................. 382/103, 255
See application file for complete search history.

(56) References Cited

U.S. PATENT DOCUMENTS 5,151,609 A * 9/1992 Nakagawa et al. ...... 250/559.22
5,384,615 A * 1/1995 Hsieh et al. ..................... 396/84
5,917,936 A * 6/1999 Katto ........................... 382/154

(Continued)

FOREIGN PATENT DOCUMENTS

JP 2011-022796 A 2/2011

OTHER PUBLICATIONS

Galleguillos, et al. "Object Categorization using Co-Occurrence, Location and Appearance." Computer Vision and Pattern Recognition, 2008. CVPR 2008. IEEE Conference on . (2008): 1-8. Print.*

(Continued)

*Primary Examiner* — Michael A Newman
(74) *Attorney, Agent, or Firm* — Fitzpatrick, Cella, Harper & Scinto

(57) ABSTRACT

In an information processing apparatus, an object recognition process is performed on each image of a multi-viewpoint image group based on focal length information and information about objects. Objects are specified in each image. A target object is determined based on relationship information indicating a relationship between the objects. An image that contains the determined target object is generated.

18 Claims, 11 Drawing Sheets

(56) References Cited

U.S. PATENT DOCUMENTS

| | | | | |
|---|---|---|---|---|
| 6,324,299 | B1* | 11/2001 | Sarachik et al. | 382/151 |
| 7,194,114 | B2* | 3/2007 | Schneiderman | 382/118 |
| 2003/0071909 | A1* | 4/2003 | Peters | 348/349 |
| 2005/0149360 | A1* | 7/2005 | Galperin | 705/2 |
| 2006/0078201 | A1* | 4/2006 | Kim et al. | 382/181 |
| 2007/0239683 | A1* | 10/2007 | Gallagher | 707/3 |
| 2009/0169122 | A1* | 7/2009 | He et al. | 382/238 |
| 2011/0150273 | A1* | 6/2011 | Moore | 382/103 |
| 2012/0162379 | A1* | 6/2012 | Dahi et al. | 348/47 |
| 2012/0203764 | A1* | 8/2012 | Wood et al. | 707/722 |
| 2012/0281132 | A1* | 11/2012 | Ogura et al. | 348/348 |
| 2013/0114864 | A1* | 5/2013 | Garcia et al. | 382/118 |

OTHER PUBLICATIONS

Okabe, et al. "Recognizing multiple objects based on co-occurrence of categories." Progress in Informatics. 7. (2010): 43-52. Print.*

Sugimoto, Akihiro. "Object Recognition by Combining Paraperspective Images." International Journal of Computer Vision. 19.2 (1996): 181-201. Print.*

Sun, et al. "Object Detection with Geometrical Context Feedback Loop." International Journal of Computer Vision. 100.2 (2012): 1-11. Print.*

B. Wilburn, et al., "High Performance Imaging Using Large Camera Arrays", U.S. Proceedings of ACM SIGGRAPH, pp. 765-776 (2005).

* cited by examiner

FIG. 5A
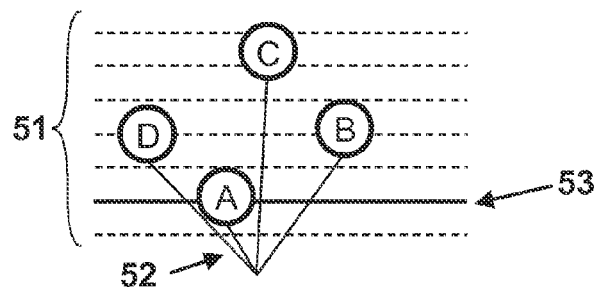
FIG. 5B
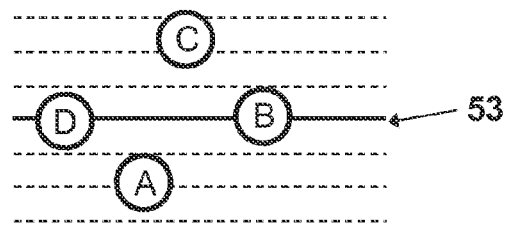
FIG. 5C
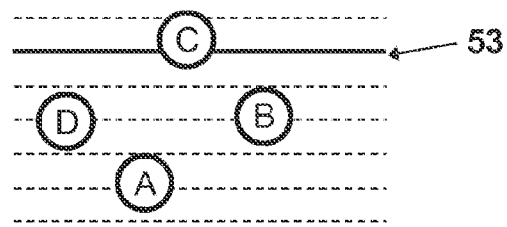
FIG. 5D
| OBJECT LIST |
|---|
| A |
| B |
| C |
| D |

F I G. 10
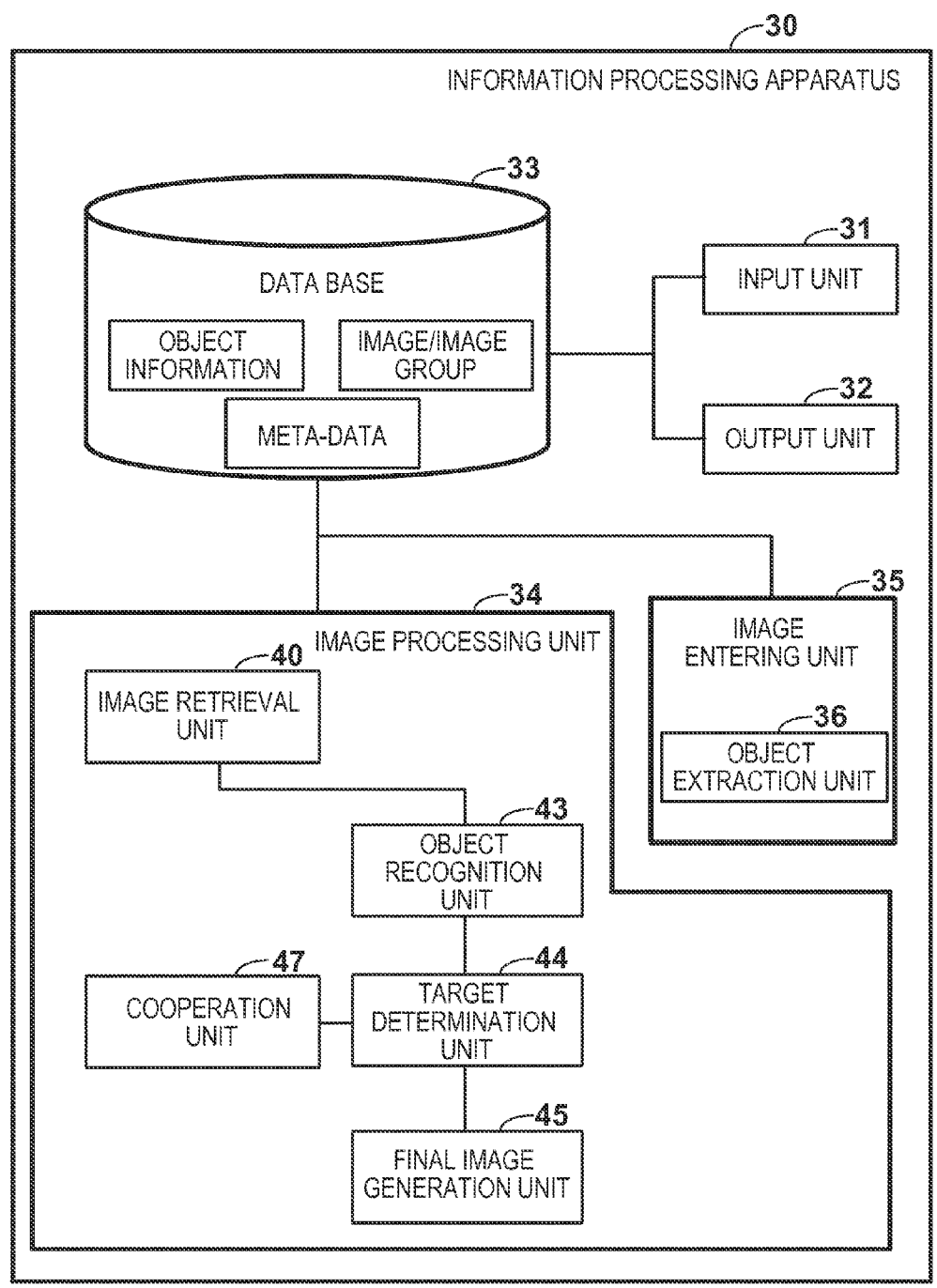

FIG. 11A
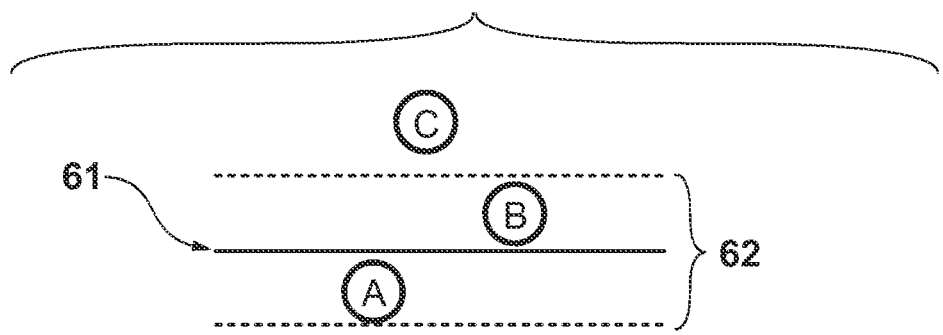
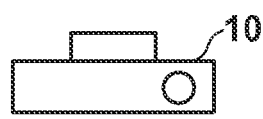
FIG. 11B
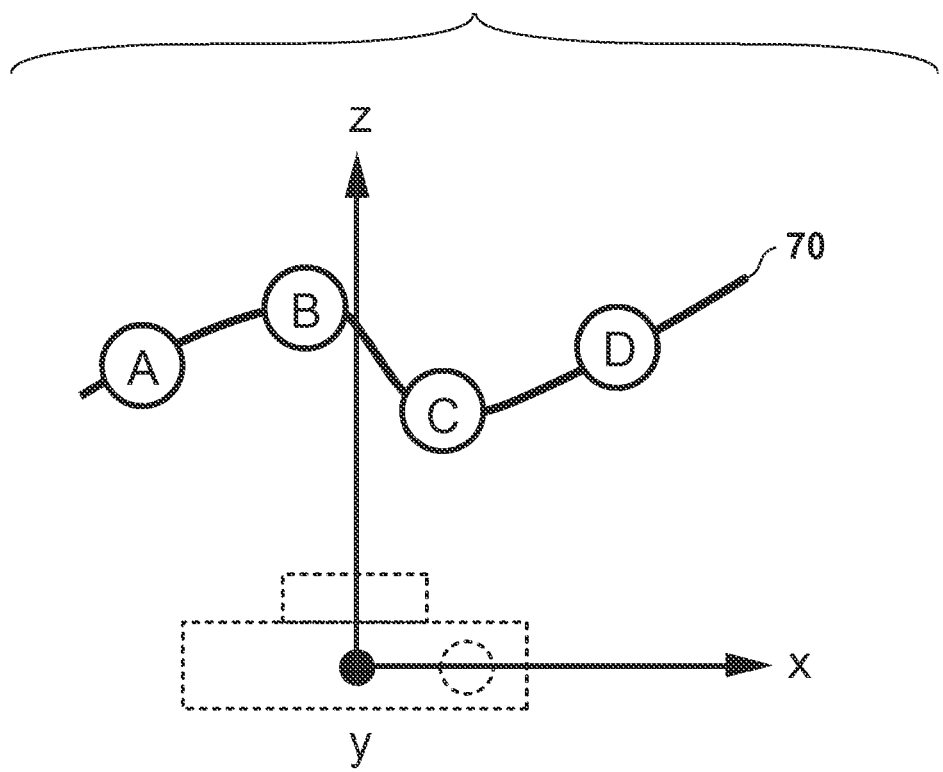

INFORMATION PROCESSING APPARATUS, CONTROL METHOD THEREOF, AND STORAGE MEDIUM

BACKGROUND OF THE INVENTION

1. Field of the Invention

The present invention relates to an information processing apparatus, a control method thereof and a storage medium.

2. Description of the Related Art

A technique of calculating arbitrary focal lengths or depths of field or generating images of different viewpoints based on images of an object captured from a large number of viewpoints is conventionally known. For example, Bennett Wilburn, Neel Joshi, Vaibhav Vaish, Eino-Ville Talvala, Emilio Antunez, Adam Barth, Andrew Adams, Mark Horowitz, Marc Levoy, "High Performance Imaging Using Large Camera Arrays," United States of America, Proceedings of ACM SIGGRAPH 2005, pp. 765-776, describes a technique of obtaining a plurality of images of different viewpoints using a plurality of cameras arranged in a matrix on a two-dimensional plane (such a multi-viewpoint image is hereinafter referred to as an image group). If a viewpoint, a focal length and an aperture diameter are given as parameters, an image is generated based on the image group by a calculation process (an image generated based on given parameters is hereinafter referred to as a final image or a combined image). Note that unless parameters are given, an image is generated based on default values. On the other hand, Japanese Patent Laid-Open No. 2011-22796 describes a technique of automatically setting parameters for generating images that allow the user to subsequently easily search the image group.

However, an image generated based on default values of parameters or parameter values set for search of the image group is not always a final image that has been given parameters appropriate to the way in which the user usually desires to use the image, such as to give the image to somebody else, to view the image together with the user's friends or family, or to record and categorize the image.

Unless an image that has been given parameters appropriate to the way in which the user desires to use the image is available, it is necessary for the user to adjust parameters, such as a viewpoint, a focal length, a depth of field and the like, which requires time and effort. The user may not understand what image will be generated based on specific parameters if the user's skill level is low. Thus, it may be difficult to only specify parameters.

SUMMARY OF THE INVENTION

In the present invention, a technique of generating an image preferred by the user based on a multi-viewpoint image group is provided.

The present invention in its first aspect provides an information processing apparatus comprising: an image management unit configured to manage a multi-viewpoint image group; an object information management unit configured to manage information about objects and relationship information indicating a relationship between the objects; a specification unit configured to specify an object in each image of the image group by performing an object recognition process on the image based on focal length information and the information about the objects; a determination unit configured to determine a target object based on the relationship information; and an image generation unit configured to generate an image that contains the determined target object specified by the specification unit.

The present invention in its second aspect provides an information processing apparatus comprising: an image holding unit configured to hold a multi-viewpoint image; an object information holding unit configured to hold information about objects and relationship information indicating a relationship between the objects; a recognition unit configured to recognize objects in the multi-viewpoint image based on the information about the objects; a determination unit configured to determine a target object from the recognized objects based on the relationship information; and a generation unit configured to generate a combined image in which the target object is in focus, based on the multi-viewpoint image.

The present invention in its third aspect provides a control method for an information processing apparatus, the method comprising the steps of: specifying an object in each image of a multi-viewpoint image group by performing an object recognition process on the image based on focal length information and information about the object; determining a target object based on relationship information indicating a relationship between objects, where an object information management unit manages information about the objects and the relationship information; and generating an image that contains the determined target object specified by the specifying step.

The present invention in its fourth aspect provides a control method for an information processing apparatus, the method comprising the steps of: recognizing objects in a multi-viewpoint image based on information about the objects; determining a target object from the recognized objects based on relationship information indicating a relationship between the objects; and generating a combined image in which the target object is in focus based on the multi-viewpoint image.

Further features of the present invention will become apparent from the following description of exemplary embodiments (with reference to the attached drawings).

BRIEF DESCRIPTION OF THE DRAWINGS

FIGS. 5A to 5D are diagrams schematically showing images obtained by a process of an object recognition unit 43.

FIG. 10 is a diagram showing an example functional configuration of the information processing apparatus 30 of the third embodiment.

FIGS. 11A and 11B are diagrams schematically showing variations of the embodiments.

DESCRIPTION OF THE EMBODIMENTS

An embodiment of the present invention will be described hereinafter in detail with reference to the accompanying drawings.

First Embodiment

Figure 1:
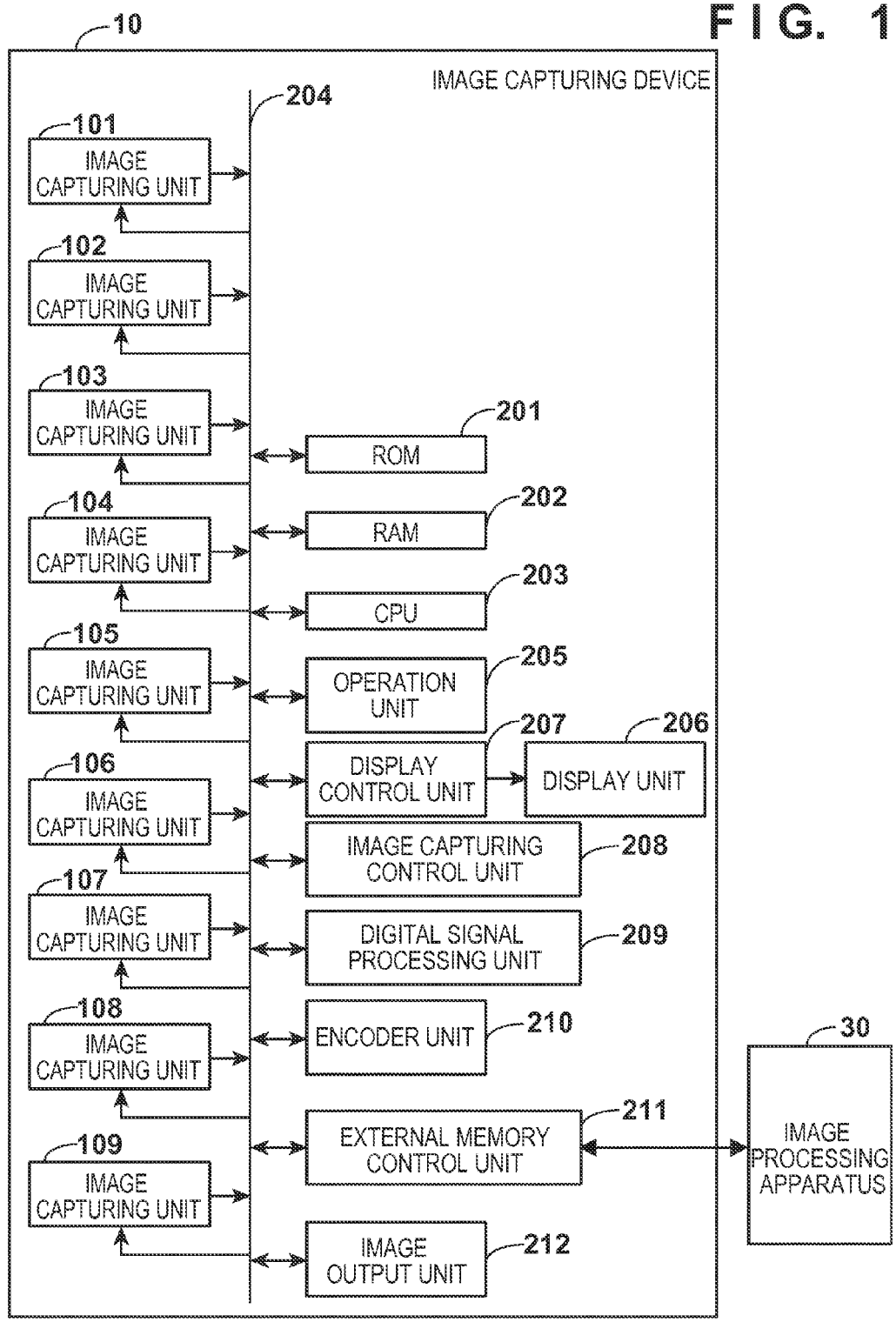
FIG. 1 is a diagram showing an example configuration of an information processing system including an information processing apparatus according to an embodiment of the present invention.

FIG. 1 is a diagram showing an example configuration of an information processing system including an information processing apparatus according to an embodiment of the present invention.

The information processing system includes an image capturing device 10 and the information processing apparatus 30. The image capturing device 10 and the information processing apparatus 30 are connected together via a communication unit, such as a universal serial bus (USB) or the like, so that they can communicate with each other.

The information processing apparatus 30 stores and manages images (e.g., images captured by the image capturing device 10). The information processing apparatus 30 includes, for example, a computer. The computer includes a main control unit (e.g., a central processing unit (CPU) etc.), and a storage unit (e.g., a read only memory (ROM), a random access memory (RAM), a hard disk drive (HDD), etc.). The computer may additionally include input/output units (e.g., a mouse, a display, etc.), a communication unit (e.g., a network card etc.), and the like. Note that these components are connected together via a bus or the like, and are controlled by a main control unit executing a program stored in the storage unit.

The image capturing device 10 includes a plurality of image capturing units to perform a multi-eye method. Here, the image capturing device 10 includes a plurality of image capturing units 101 to 109, a ROM 201, a RAM 202, a CPU 203, an operation unit 205, a display control unit 207, a display unit 206, and an image capturing unit control unit 208. The image capturing device 10 additionally includes a digital signal processing unit 209, an encoder unit 210, an external memory control unit 211, and an image output unit 212. Note that these components of the image capturing device 10 are connected together via a bus 204 or the like so that they can communicate with each other.

The central processing unit (CPU) 203 controls inputs and outputs, processes data, and the like. The random access memory (RAM) 202 temporarily stores the results of calculation or data. The read only memory (ROM) 201 stores a program that executes a control according to this embodiment, or data. The components of the image capturing device 10 may be implemented, for example, by the CPU 203 executing a program stored in the ROM 201 using the RAM 202 as a work area.

The operation unit 205, which may be implemented as, for example, a button, a mode dial or the like, is used to input various commands from the user to the apparatus. The display unit 206, which may be implemented as, for example, a liquid crystal display or the like, displays various information items (e.g., captured images, characters, etc.) for the user. The display control unit 207 controls the display unit 206 so that various information items are displayed on the display unit 206. Note that the operation unit 205 and the display unit 206 may be integrated together into a touch screen.

The image capturing unit control unit 208 controls an image capturing system. For example, the image capturing unit control unit 208 adjusts a focus, opens and closes a shutter, adjusts an aperture, and the like. The control is performed based on commands from the CPU 203.

The digital signal processing unit 209 performs, on digital data received via the bus 204, various processes, such as a white balance process, a gamma process, a noise reduction process, and the like. The encoder unit 210 converts digital data into a file format, such as JPEG, MPEG or the like. The external memory control unit 211 controls communication with an external memory inserted in the image capturing device 10. Examples of the external memory include, for example, media (e.g., a hard disk, a memory card, a CF card, an SD card, a USB memory, etc.) and the like in addition to information processing apparatuses (e.g., a personal computer (PC) etc.).

Figure 2A:
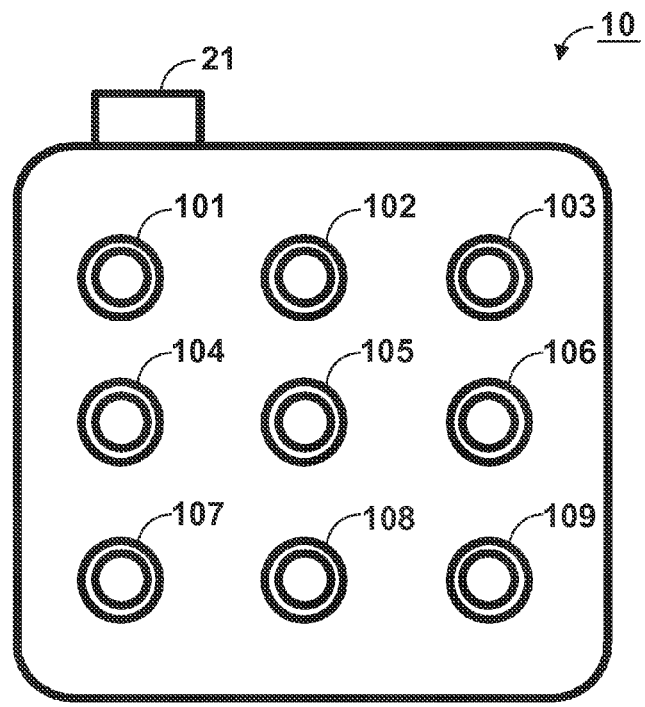
FIGS. 2A and 2B are diagrams showing an example configuration of an image capturing unit.

The image capturing units 101 to 109 obtain color images. For example, as shown in FIG. 2A, the image capturing units 101 to 109 are equally spaced and arranged in a square matrix. When the user depresses a shutter button 21, the image capturing units 101 to 109 receive optical information of an object using a sensor (image sensing element). Thereafter, in the image capturing device 10, the received signal (analog signal) is converted into a digital signal, so that a plurality of color images (digital data) are obtained. By the image capturing device 10 employing such a multi-eye method, a color image group of the same object captured from a plurality of viewpoint positions can be obtained.

Figure 2B:
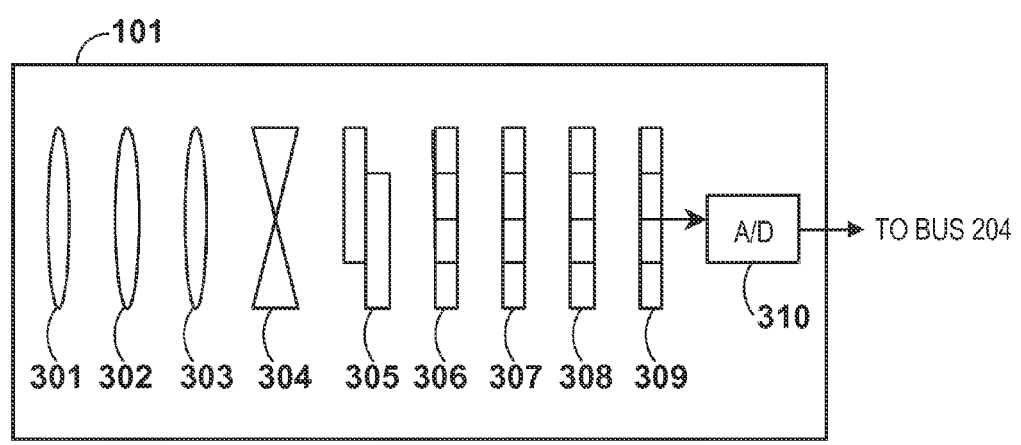

Here, the configuration of the image capturing units 101 to 109 will be further described. Note that the image capturing units 101 to 109 have substantially the same configuration, and therefore, the configuration of the image capturing unit 101 will be described as a representative example. As in FIG. 2B, the image capturing unit 101 includes a plurality of lenses 301 to 303, an aperture 304, a shutter 305, an optical low pass filter 306, the iR cut filter 307, a color filter 308, a sensor 309, and an A/D converter 310.

The lenses 301 to 303 include, for example, a zoom lens 301, a focus lens 302, and a shake correction lens 303. The sensor 309 is implemented as an image sensing element, such as a complementary metal oxide semiconductor (CMOS), a charge-coupled device (CCD), or the like, to detect light transmitted through the above-described components. The A/D converter 310 converts light detected by the sensor 309 into a digital value, and supplies the digital value as digital data to the bus 204.

The image output unit 212 outputs a color image group obtained by the image capturing units 101 to 109 or a color image group output by the digital signal processing unit 209, in a form that allows the image group to be identified as a group of images that are obtained by capturing the same object.

In the foregoing description, an example functional configuration of the image capturing device 10 has been described. Note that the above-described configuration of the image capturing device 10 is for illustrative purposes only. The present invention is not limited to the above-described configuration. Elements may be added, removed or the like as appropriate.

For example, in the foregoing description, the number of the image capturing units is nine as an example. The number of the image capturing units is not limited to nine. Specifically, the image capturing device may include a plurality of image capturing units, and the number of the image capturing units may not be limited. In the foregoing description, the nine image capturing units are equally spaced and arranged in a square matrix as an example. The present invention is not limited to this. The image capturing units may be arranged in an arbitrary geometry. For example, the image capturing units may be arranged in a radial or linear pattern or in a completely random pattern. In addition, all or a part of images captured by the image capturing units 101 to 109 may be a monochrome image. In this case, the color filter 308 of FIG. 2B may be removed.

Figure 3:
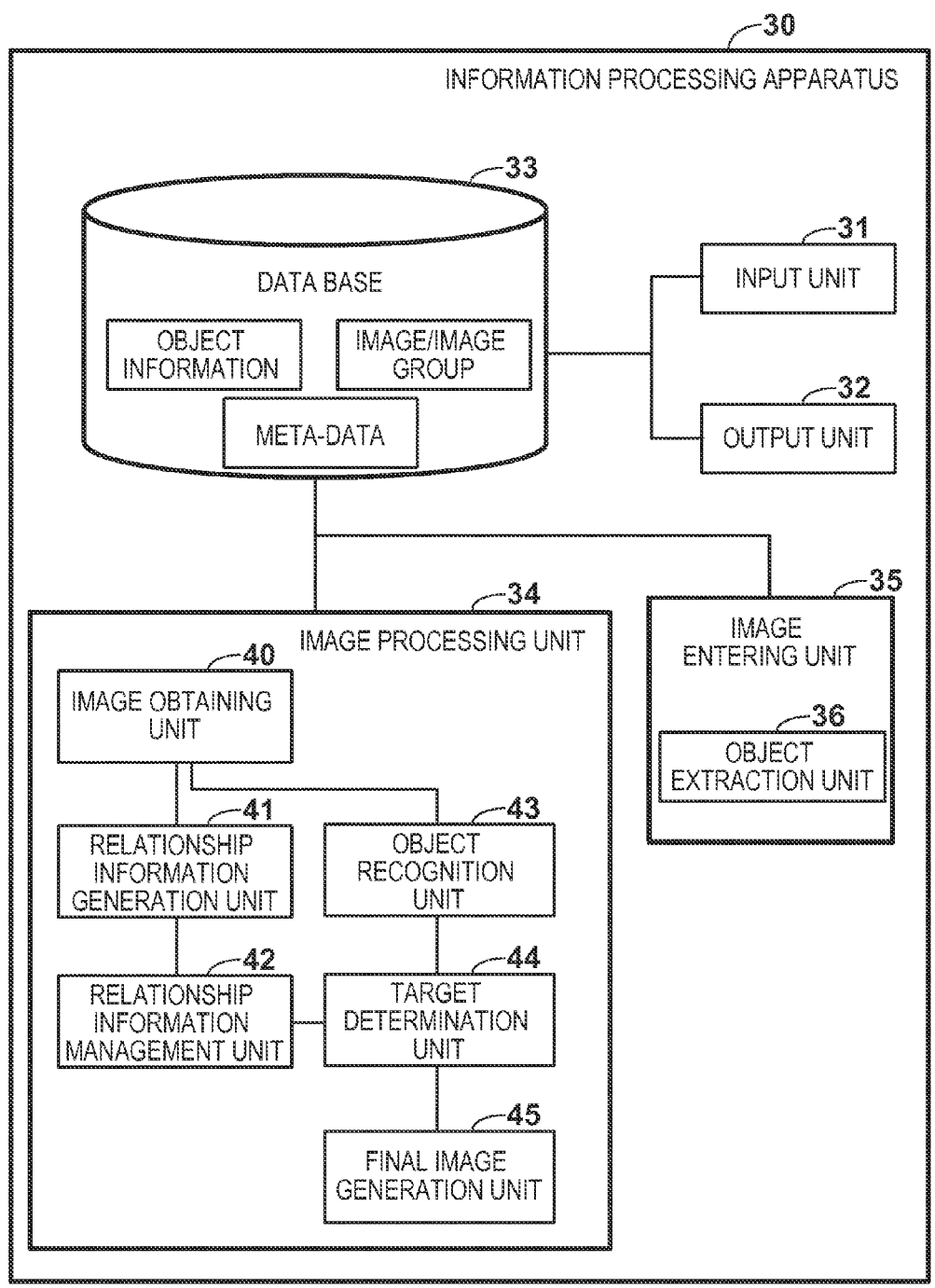
FIG. 3 is a diagram showing an example functional configuration of an information processing apparatus 30.

Next, an example functional configuration of the information processing apparatus 30 of FIG. 1 will be described with reference to FIG. 3.

As the functional configuration, the information processing apparatus 30 includes an input unit 31, an output unit 32, a database 33, an image processing unit 34, and an image entry unit 35.

The input unit 31 inputs, to the apparatus, commands from the user via, for example, a mouse, a keyboard, or the like. The output unit 32 outputs various information items to, for example, a liquid crystal display or the like.

The database 33, which is implemented by, for example, a RAM, an external storage device or the like, functions as an image managing unit that manages images or information about the images. More specifically, the database 33 manages images, attribute information about the images, information about the user that uses the information processing apparatus 30, and the like.

The image entry unit 35 enters images into the database 33. The image entry unit 35 includes an object extraction unit 36. The object extraction unit 36 performs a facial authentication process on an image to be entered, thereby specifying and extracting an object. The facial authentication process may be performed using a typical technique of using a facial feature. A facial feature of a person to be specified is previously learned. A partial region in an image that has a feature similar to the facial feature is specified as that person. Note that when an image is entered, information about an object specified by facial recognition performed by the object extraction unit 36 is entered as object information into the database 33.

The image processing unit 34 performs various image processes on a (multi-viewpoint) image group stored in the database 33. Not only multi-viewpoint image groups, but also composite images, and other images are stored in the database 33. The image processing unit 34 includes an image obtaining unit 40, a relationship information generation unit 41, a relationship information management unit 42, an object recognition unit 43, a target determination unit 44, and a final image generation unit 45.

The image obtaining unit 40 obtains images from the database 33. The relationship information generation unit 41 generates information about a relationship between objects, based on the images obtained by the image obtaining unit 40. For example, the relationship information is generated as follows. Objects are recognized in the entire images managed by the user. The frequency of occurrence of each object, the frequency of co-occurrence of objects in the same image, or the like is calculated. For example, the occurrence frequency of each object indicates how much likely the object is to occur in the images managed by the user, and based on the occurrence frequency, relationship information between the user and the object can be generated. The co-occurrence frequency of objects indicates how much likely the objects are to be shot together, and based on the co-occurrence frequency, relationship information between the objects can be generated. Note that, instead of directly using the occurrence frequency, the proportion of the occurrence frequency with respect to the number of images, or the like, may be calculated.

Note that the relationship information may be one that indicates only the presence of the relationship, or may include attribute information possessed by the relationship. For example, the above-described information (the occurrence frequency or the co-occurrence frequency) of an object can be said to be information indicating the strength of the relationship, which may be included as attribute information in the relationship information.

Of course, the attribute information is not limited to this. For example, the user may designate systematic images for the information processing apparatus 30 (e.g., images taken during one trip can be designated and managed together as a group). In this case, information such as the occurrence frequency or the like may be calculated in the systematic group, and information indicating that images have been divided into separate groups may be included as relationship attribute information.

In addition, if information about a role of one object with respect to another object is known, the role information may be included as relationship attribute information in relationship information between the objects. For example, if objects D and M are a parent and a child, the role information may be included as relationship attribute information. The role information may be obtained from any information. For example, the role information may be obtained from information that has been entered into the information processing apparatus 30 by the user.

Figure 4:
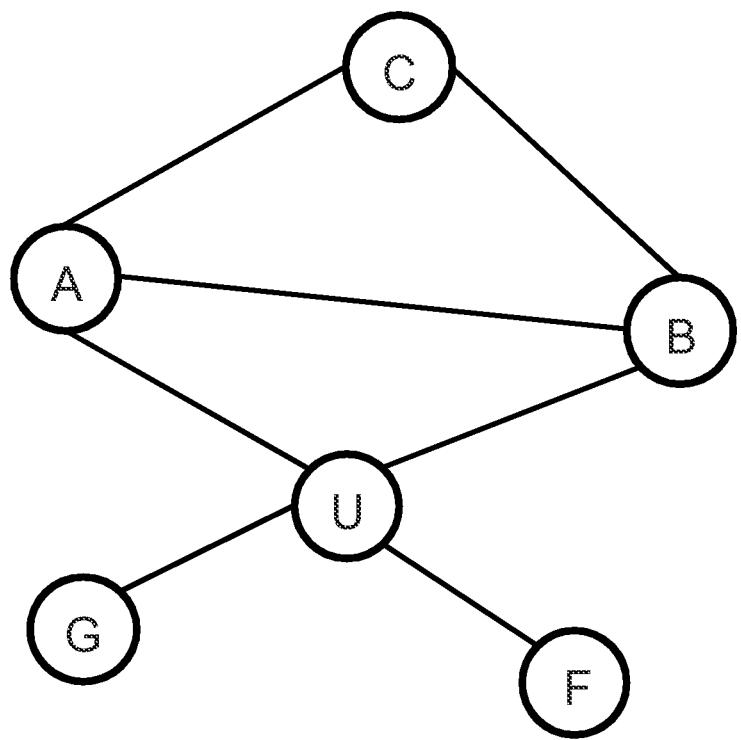
FIG. 4 is a diagram schematically showing relationship information.

For example, as shown in FIG. 4, the relationship information thus generated can be represented by a network structure in which users and objects are nodes. In this case, a node U indicates a user, and nodes A, B, F and G indicate a relationship that, in an image managed by the user, the occurrence frequency is higher than or equal to a predetermined threshold. In contrast to this, a node C indicates that the occurrence frequency is not sufficient in the images managed by the user, and therefore, there is not a relationship with the user. However, the node C indicates that the co-occurrence frequencies with the nodes A and B are higher than or equal to a predetermined threshold, and therefore, there is a relationship that the node C is likely to be shot simultaneously with the nodes A and B.

Note that relationship information may have any data format that can represent such a structure as that shown in FIG. 4. If every relationship may contain attribute information, relationship information may be generated in the XML format, which can describe structured information. For example, relationship information may be described in the XML format (RDF/XML) that employs a resource description framework (RDF). RDF is standardized as a format that describes resources such as people or things and relationships therebetween in the world wide web consortium (W3C).

The relationship information management unit 42 manages the relationship information generated by the relationship information generation unit 41. The object information is managed by a configuration including the relationship information management unit 42, the database 33 and the like. The relationship information management unit 42 manages new relationship information after merging the new relationship information with existing relationship information. For example, when a relationship between an existing person A and a new person X is detected, a new relationship, attribute information thereof, and information indicating that a target is X are additionally written into a portion in which existing information about the person A is described.

In response to a query including an object, a relationship, attribute information thereof or the like as a key, the relationship information management unit 42 also searches for relationship information meeting the condition, and returns the result. An example of the query is one that instructs the relationship information management unit 42 to search for a relationship with a person A and a person related to the person A in that relationship. This search may be performed, for example, using a query description language, such as the SPARQL protocol and RDF query language (SPARQL) standardized in W3C, which searches data in the RDF/XML format. Note that the managed relationship information and the returned relationship information may be described in any data format that can be used to describe structured information, such as, for example, RDF/XML, as in the relationship information generation unit 41.

The object recognition unit 43 performs a facial recognition process on an image group obtained by the image obtaining unit 40 while performing a focus adjustment process. As a result, an image of an in-focus object is retrieved. More specifically, the focus adjustment process is performed on each image to generate an image of an in-focus target (object) located at each focal length. Note that the focus adjustment process may be performed, for example, while changing (increasing) the value of the focal length set as a parameter in predetermined increments.

Here, an image obtained by the process of the object recognition unit 43 will be briefly described with reference to FIGS. 5A to 5C.

FIG. 5A shows objects A to D. Here, it is assumed that the image capturing device 10 is located below the figure, and positions relative to the image capturing device 10 are shown. A reference character 52 indicates focal lengths that are set to values that increase in predetermined increments. Final images having these focal lengths as a parameter (combined images generated based on the parameter) are generated.

A reference character 53 indicates a focal length. In the case of the focal length of FIG. 5A, a final image in which at least the object A is in focus is obtained. Similarly, in the case of the focal length of FIG. 5B, the objects B and D are in focus. In the case of the focal length of FIG. 5C, the object C is in focus.

The object recognition unit 43 performs a facial recognition process on each of the images thus obtained to generate a list of persons that have been specified with a likelihood higher than a predetermined threshold (see FIG. 5D).

The target determination unit 44 determines an object to be targeted (target object) from objects specified by the object recognition unit 43. For example, if it is desirable to obtain a final image preferred by a user who has entered the image group, the target determination unit 44 retrieves relationship information containing the user from the relationship information management unit 42. Thereafter, a person contained in the relationship information is selected from persons specified by the object recognition unit 43, and is designated as a target.

In this case, it is necessary to associate a person (object) specified by the target determination unit 44 with a person (object) managed by the relationship information management unit 42. To this end, the target determination unit 44 holds, for example, a correspondence relationship between an object specified by the object extraction unit 36 and an object specified by the object recognition unit 43. Note that any technique that can associate objects with each other may be employed. For example, the target determination unit 44 and the object extraction unit 36 may perform the same facial recognition process to obtain the same specification result.

The final image generation unit 45 combines focus-adjusted images of targets determined by the target determination unit 44 to generate a multi-viewpoint image. In this embodiment, focal length information and a face position of a person of interest (target) specified by the object recognition unit 43 are held. Thereafter, a distance at which the face position is in focus is determined around the focal length.

Specifically, images around the focal length are generated, and it is determined which of the images is in focus, by employing a general autofocus technique that achieves focus based on the images, such as a contrast detection autofocus. In this case, an image that is in sharpest focus is designated as a final image.

Note that if there are a plurality of targets, the final images of the found targets are generated. Of course, the present invention is not limited to such a technique. For example, if occurrence frequency information is obtained as relationship attribute information managed by the relationship information management unit 42, objects may be sorted in descending order of occurrence frequency, and a final image may be generated for each of a predetermined number of objects having highest occurrence frequencies.

In the foregoing description, an example configuration of the information processing apparatus 30 has been described. Note that the configuration of the information processing apparatus 30 of FIG. 3 is for illustrative purposes only, and may be changed or modified as appropriate. For example, all or a part of the components implemented in the image processing unit 34 may be provided in an external apparatus (e.g., a cloud scheme). In this case, the information processing apparatus 30 receives the results of processes from the external apparatus, and based on the process results, performs various processes.

Figure 6:
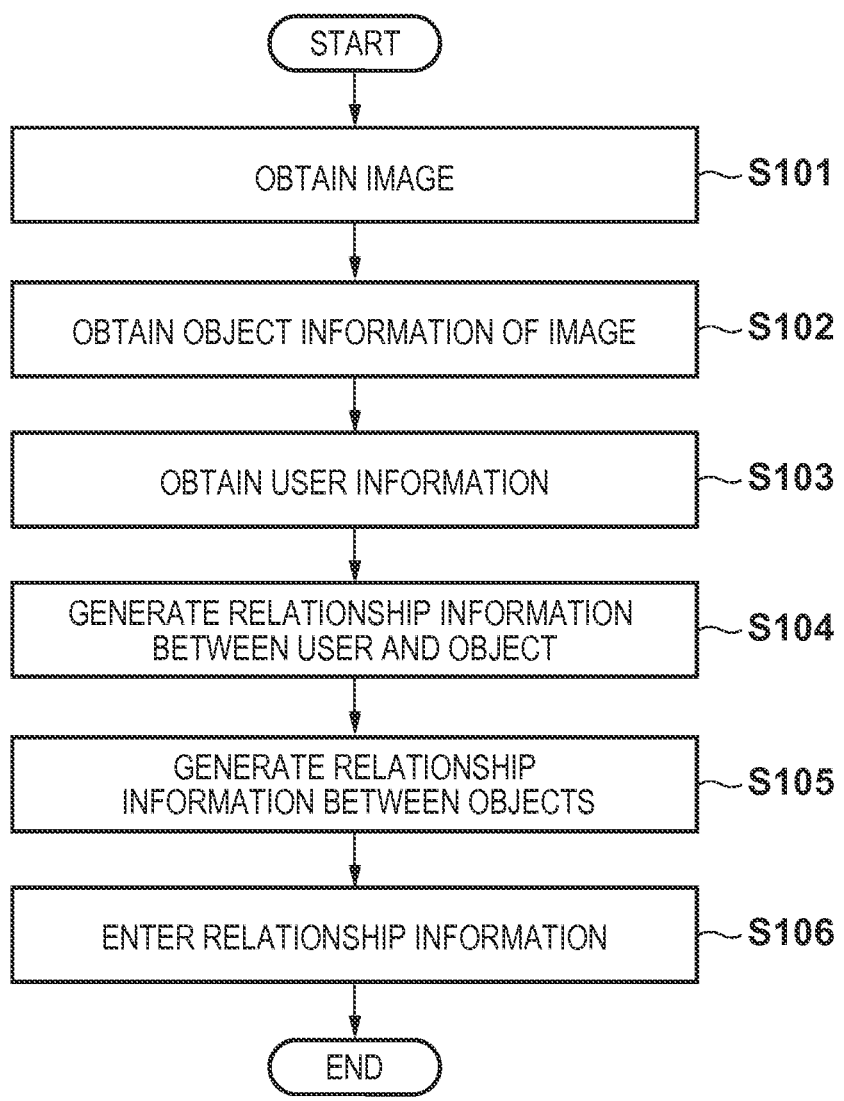
FIG. 6 is a flowchart showing an example flow of a process of the information processing apparatus 30.
Figure 7:
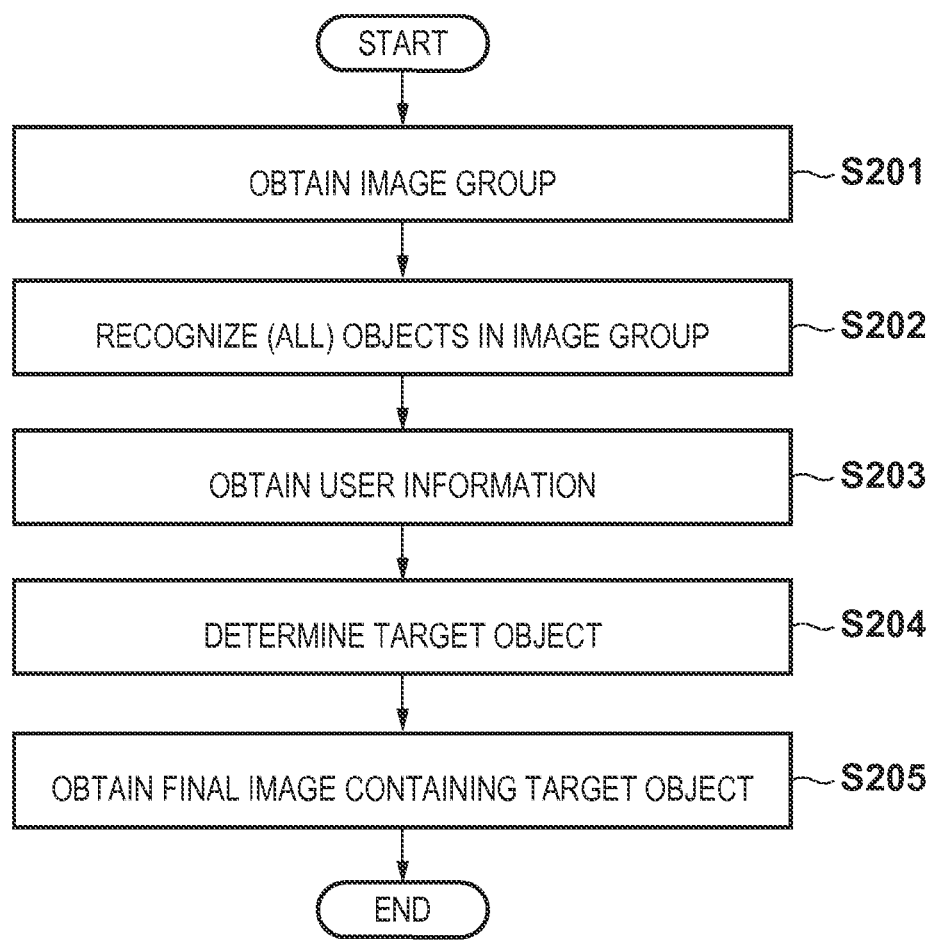
FIG. 7 is a flowchart showing an example flow of a process of the information processing apparatus 30.

Next, an example flow of the process performed by the information processing apparatus 30 of FIG. 1 will be described with reference to FIGS. 6 and 7. Firstly, a flow of a process of retrieving relationship information will be described with reference to FIG. 6.

The information processing apparatus 30 obtains images from the database 33 using the image obtaining unit 40 (S101). In this embodiment, it is assumed that the user previously defines systematic groups for the information processing apparatus 30, and images are managed so that the images belong to the corresponding groups. Therefore, in S101, images are retrieved in systematic images.

Next, the information processing apparatus 30 retrieves object information of the images from the database 33 using the image processing unit 34 (S102). As described above, images have been entered into the database 33 along with the object information of an object specified by the facial recognition process of the object extraction unit 36. Therefore, in S102, the object information is retrieved from the database 33.

The information processing apparatus 30 obtains information (user information) of the user who manages the images retrieved in S101 using the image processing unit 34 (S103). Note that the user as used herein refers to a user who uses the information processing apparatus 30, and in S103, for example, the user information may be obtained based on log-in information or the like. Of course, target user information may be individually input.

After the user information has been obtained, the information processing apparatus 30 analyzes the object information obtained in S102 to generate relationship information with the user specified in S103 using the relationship information generation unit 41 (S104). Thereafter, based on the frequency of co-occurrence in the same image of the objects obtained in S102, the information processing apparatus 30 generates relationship information between each of the objects (S105). Thereafter, the information processing apparatus 30 enters and manages the generated relationship information using the relationship information management unit 42 (S106).

Next, a flow of a process of (automatically) generating a final image based on the image group will be described with reference to FIG. 7. The process of FIG. 7 is performed, for example, when images are entered, and is performed following the end of the process of FIG. 6. Note that, of course, this process may be (automatically) generated in accordance with the user's instruction or with arbitrary timing.

The information processing apparatus 30 obtains an image group using the image obtaining unit (S201). Thereafter, the information processing apparatus 30 processes the image group retrieved in S201, and recognizes (all) objects in the image group while performing focus adjustment, using the object recognition unit 43 (S202).

Next, the information processing apparatus 30 obtains information (user information) about the user who desires to process the image group, using the image processing unit 34 (S203). The user as used herein refers to a user who uses the information processing apparatus 30, and in S203, for example, the user information may be obtained based on log-in information or the like.

After the user information has been obtained, the information processing apparatus 30 specifies an object related to the user obtained in S203, from the objects recognized in S202, and determines that object as a target, using the target determination unit 44 (S204).

Finally, the information processing apparatus 30 performs a focus adjustment process on the target determined in S204 to obtain (generate) a final image using the final image generation unit 45 (S205).

As described above, in this embodiment, when an image group is entered, a final image in which focus adjustment has been performed on targets (an image in which focus adjustment has been performed on targets) is generated. In other words, an image in which objects having a strong relationship with the user are in focus is generated based on a plurality of images (having different focal lengths). Therefore, an image preferred by the user is automatically generated.

As a result, the user's time and effort can be reduced when generating a final image by specifying parameters. For example, when the user desires to send images related to a friend in a plurality of image groups, the user does not need to perform a complicated operation (e.g., to generate a final image for each image group), whereby user-friendliness is improved.

Second Embodiment

Next, a second embodiment will be described. In the first embodiment, as an example, the target determination unit 44 finds a target, for example, based on the presence or absence of a relationship between objects. The present invention is not limited to this. As another example, in the second embodiment, a target object is determined based on the context of who uses an image for what purpose.

Figure 8:
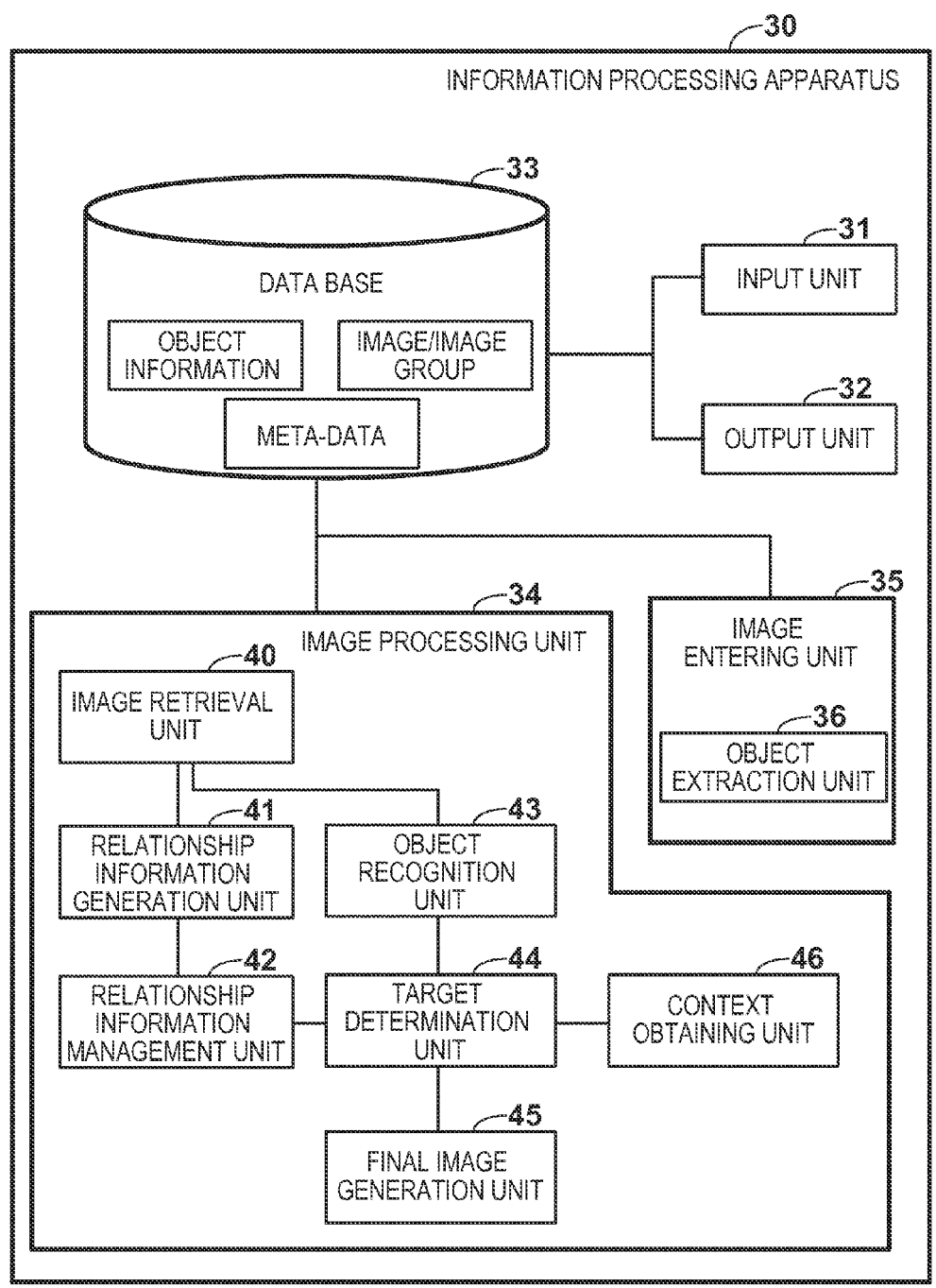
FIG. 8 is a diagram showing an example functional configuration of an information processing apparatus 30 according to a second embodiment.

As shown in FIG. 8, an information processing apparatus 30 according to the second embodiment additionally includes, in an image processing unit 34, a context obtaining unit 46 that obtains a context.

The context obtaining unit 46 obtains, for example, a context that is obtained during an operation of an output function to the user. Thereafter, a target determination unit 44 of the second embodiment determines a target based on the result (weighted result) of evaluation of the above-described relationship information based on the context. Note that the evaluation result is weighted based on the context in a predetermined manner. Examples of the context include information for assisting presentation of a photograph album to grandparents, production of a slide show of memories of a daughter who is going to be married, browsing of travel photographs by a group of people who went on a trip together, and other general browsing. In other words, the context is set for each predetermined image group.

Here, the way in which the weighting is performed is previously determined based on an object or an attribute of a relationship for each context. For example, in the case of presentation of a photograph album to grandparents, it is desirable that images containing a grandchild be mainly selected. Therefore, if role information is set as relationship information, the relationship is weighted so that an object that is a grandchild relative to grandparents is designated as a target in an image group.

In the case of production of a slide show of memories of a daughter who is going to be married, the weighting is performed so that an object that is a daughter relative to the user is designated as a target. In this case, if something like a distribution of co-occurrence frequency during a certain period is managed as a relationship attribute, the weighting may be performed so that an object that occurs simultaneously with the daughter during that period may be simultaneously designated as a target.

In the case of browsing of travel photographs by some members of a group who went on a trip together, the weighting is performed so that, of objects related to the user (i.e., the user's friends), one or some persons who are browsing photographs together with the user are designated as a target. Alternatively, in general browsing, importance is put on a relationship that is considered to be important irrespective of the context. Examples of the important relationship include a close blood relationship with the user, and a relationship having a high co-occurrence frequency at a time near the time of generation of the final image.

If the image group corresponds to the date of a known annual event (e.g., Mother's Day, Children's Day, the birthday of a family member or a friend, etc.), there may be a rule that a relationship with a person playing a leading role in the event is weighted. For example, in the case of images taken on Mother's Day, the relationship may be weighted so that a mother or an object that often occurs simultaneously with the mother is designated as a target. Similarly, if a browsing day coincides with a known annual event, the relationship may be weighted so that an object serving as a main part of the event is designated as a target object.

Note that such weighting does not need to be used exclusively for specific contexts. In particular, the rule for general browsing is not dependent on a specific context, and therefore, may be invariably taken into consideration.

As described above, in the second embodiment, a more preferred image is obtained by a context-dependent process (production of a photograph album, production of a slide show, etc.). In addition, a preferred final image is automatically obtained, and therefore, an automatic generation process can be implemented by an application or the like without the need of the user's operation.

Third Embodiment

Next, a third embodiment will be described. In the first embodiment, relationship information is generated based on an image group obtained by the image obtaining unit 40. The present invention is not limited to this. For example, information about a social relationship between users or objects registered in a relationship information management service such as a social network service (hereinafter referred to as an "SNS") may be used as relationship information. In other words, a relationship information management service may be used in production or management of relationship information between users or objects.

Figure 9:
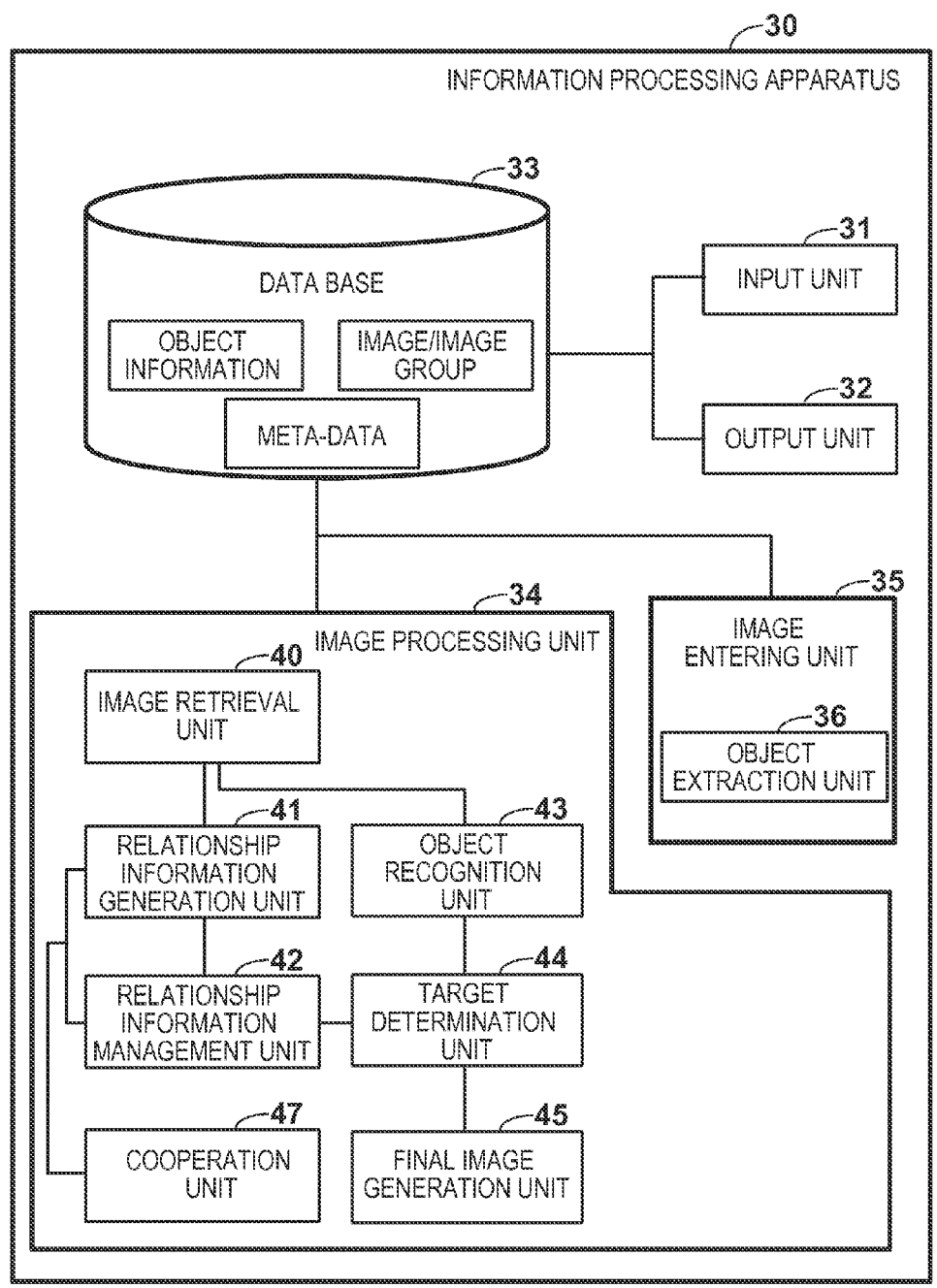
FIG. 9 is a diagram showing an example functional configuration of an information processing apparatus 30 according to a third embodiment.

In this case, an information processing apparatus 30 has such a configuration as that shown in FIG. 9 or 10. Specifically, a cooperation unit 47 is additionally provided in an image processing unit 34. The cooperation unit 47, when the information processing apparatus 30 is connected to an external service, accesses the external service via a network interface (not shown) and cooperates with the external service. As a result, a part of (FIG. 9) or all (FIG. 10) of the functions of a relationship information generation unit 41 and a relationship information management unit 42 may be implemented using the relationship information management service.

Here, it is necessary to use relationship information in the relationship information management service. Therefore, the cooperation unit 47 has at least a function of logging on as a user in the relationship information management service, and a function of obtaining information about relationship information of the user. In this case, it is necessary to associate relationship information in the relationship information management service with relationship information handled in the information processing apparatus 30. To achieve this association, a table in which identifiers of targets to be managed in both the relationship information management service and the information processing apparatus 30 may be produced, and may be managed by the cooperation unit 47.

Information corresponding to the table may be previously input and set by the user. For example, when a face image is registered as a target to be recognized into the information processing apparatus 30, an identifier (e.g., the user's name etc.) in the relationship information management service may be set as an identifier for the target to be registered. Even when the information corresponding to the table for associating relationship information in the relationship information management service with relationship information in the information processing apparatus 30 cannot be input or has not been input, the user's name or attribute that is managed by both the relationship information management service and the information processing apparatus 30 may be used to associate relationship information in the relationship information management service with relationship information in the information processing apparatus 30. In this case, for example, it may be determined whether or not to perform the association, based on whether or not the same information has been input to the same attribute.

Note that, in the relationship information management service, relationship information may not be generated based on images. In such a case, the process result of the relationship information generation unit 41 may be added via the cooperation unit 47 to relationship information in the relationship information management service. In this case, the cooperation unit 47 has a function of editing relationship information in the relationship information management service. A certain user's relationship information generated by the relationship information generation unit 41 is added or updated as the user's relationship information in the relationship information management service associated with the user.

As described above, in the third embodiment, if relationship information is generated and managed in an external service (e.g., an SNS etc.), the information processing apparatus 30 cooperates with the external service. As a result, relationship information can be managed in an integrated manner, but not in a distributed manner. Compared to when relationship information is managed by the external service and the image processing apparatus 30 separately, the cost of registration and maintenance can be reduced, and in addition, a mismatch between information in the external service and information in the image processing apparatus 30 can be curbed.

In the foregoing description, representative exemplary embodiments of the present invention have been described. The present invention is not limited to the embodiments described above and shown in the drawings. Changes and modifications may be made without departing the scope and spirit of the present invention. Some variations will be described hereinafter.

(First Variation)

In the foregoing description, a facial recognition process is performed to specify a person based on a face image in the object extraction unit 36 or the object recognition unit 43. The present invention is not limited to this. A recognition process may be performed on a pet or a thing as an object. For example, in the case of the second embodiment, when a landmark in a trip can be recognized in travel records, then if a relationship between the landmark and a person that simultaneously occurs with the landmark is weighted, the landmark and the person may be designated as a target.

(Second Variation)

In the foregoing description, when there are a plurality of targets, a final image is generated so that all the targets are in focus. The present invention is not limited to this. For example, a focal length may be calculated for each target, a median of the focal lengths is set as a focal length parameter, and a parameter for an aperture diameter may be reduced to increase a depth of field from a focal point. In this case, a final image in which all targets are in focus can be generated.

This process will be further specifically described with reference to FIG. 11A. Here, objects A and B are selected as a target. A reference character 10 indicates an image capturing device for capturing a multi-viewpoint image. In this case, a focal point is set at a mid point between the objects A and B as indicated by a reference character 61. A parameter for an aperture diameter is adjusted so that a depth of field 62 covers the objects A and B, thereby generating a final image.

Note that relationship information between targets managed by the relationship information management unit 42 may be obtained, and if there is a relationship between the targets, the process of FIG. 11A may be performed. In other words, a plurality of targets may be divided into groups based on the relationship information, and a final image may be generated for each group.

In this case, if information with which the strength of a relationship can be evaluated, such as the co-occurrence frequency of targets or the like, is obtained as relationship attribute information, a final image may be generated in which all objects having a co-occurrence relationship are allowed, with priority, to be in focus.

If information about such a weighted relationship as that described in the second embodiment is obtained, a final image may be generated in which all objects having an important relationship matching a context are in focus.

As described above, in the second variation, a final image is generated in which a plurality of objects are all in focus. As a result, when utilizing such an image, the user's time and effort for generating the image can be reduced.

(Third Variation)

The present invention is not limited to the process of the second variation. Moreover, for example, a technique (conventional art) of calculating a surface containing coordinate positions of a plurality of targets, and adjusting a focal point along the surface, may be employed.

This process will be described with reference to FIG. 11B. Assuming that there are four target objects A to D, a virtual focal plane (surface) 70 is set, and a focal point is adjusted in accordance with the focal plane 70 to generate a final image. Note that, as in the second variation, of course, a combination of targets may be determined based on relationship information between the targets.

As described above, in the third variation, even if there are variations in the distribution of distances from an image capturing device to targets, a final image with a small depth of field (shallow focus) in which attention is paid to all targets, can be generated.

(Fourth Variation)

For example, a target to be recognized in the object extraction unit 36 may be character sequence information of a text object in an image. In this case, if a sequence of characters is recognized, it is determined whether or not the character sequence is text information related to an object in the image. If the determination result is positive (i.e., the character sequence is related to the object), focus adjustment is performed to generate a final image in which both the character sequence and the object are in focus.

For example, it is assumed that an image contains a signboard, a sequence of characters "Entrance Ceremony" or "Matriculation Ceremony" is written on the signboard, and a daughter appears in the image. In this situation, if it is determined that the ceremony was for the daughter, based on the daughter's information about birthday, shooting date and time, and knowledge about an "entrance ceremony", an image in which both the daughter's face and the signboard are in focus may be generated, for example.

(Fifth Variation)

In the above-described embodiments, an image group captured by the image capturing device 10 is input to the information processing apparatus 30. The present invention is not limited to this. Specifically, an image group to which a focus adjustment process can be applied may be input to the information processing apparatus 30. For example, it is known that an equivalent image group can be obtained using a plurality of lenses and a single sensor. An image group thus obtained may be input to the information processing apparatus 30.

(Sixth Variation)

In the above-described embodiments, as an example, the focus adjustment process of the final image generation unit 45 is to cause a target to be in focus. For other portions (e.g., a background portion etc.), the focus adjustment process has not been particularly mentioned.

In this regard, as large a field other than targets as possible may be blurred or sharpened (in focus), for example. For example, whether to blur or sharpen may be determined based on the context. Specifically, the way of focus adjustment on a region other than targets may be managed along with a relationship evaluation rule, based on a context obtained by the configuration including the context obtaining unit 46 (see FIG. 8). Based on the selected focus adjustment process and relationship evaluation rule, the final image generation unit 45 may generate a final image.

Alternatively, as a more general example, if a target is a person, then when his or her face having a certain size occupies an image, and no other objects are recognized, the image is likely to be taken as a portrait by the user. In such a case, the background in the image is blurred in order to emphasize the face portion. Such a typical rule may be associated with the way of focus adjustment for portions other than targets to generate a final image. In this case, for example, information about the rule and the way of focus adjustment for portions other than targets may be previously set in the final image generation unit 45.

(Seventh Variation)

In the above-described embodiments, as an example, a target to be processed is a still image. The present invention is not limited to this. For example, a process target may be a moving image whose frames each have information of a multi-viewpoint image. In this case, the above-described process may be performed on each frame of a moving image.

Note that when a moving image is browsed, it is not preferable that targets be frequently changed on a frame-by-frame basis. A moving image is more typically obtained by capturing a scene lasting for a relatively long time than by capturing an instantaneous scene like a photograph. Therefore, it is desirable that a target be determined for an entire scene lasting for a relatively long time, and focus adjustment be performed on that target, resulting in the unity of the entire scene.

In this case, each part of the image processing unit 34 performs a process on all frame images in the entire scene. In other words, objects may be analyzed in all frames in the entire scene, relationships may be determined between the objects, and a target may be selected from the objects.

In the case of a moving image, a region in which focus adjustment is to be performed is determined for each frame by a typical tracking process of tracking a determined target object, and a final image of each frame is generated so that the region is in focus.

Note that a target object may be temporarily hidden by another object or go out of a frame, so that the target object may fail to be tracked in a frame. In order to prevent a focal length from being significantly changed due to such a problem, a region and a focal length in a frame lacking the tracked target object may be interpolated based on regions and focal lengths in the previous and next frames containing the tracked target object.

Other Embodiments

Note that the present invention may be embodied as, for example, a system, an apparatus, a method, a program, a storage medium, or the like. Specifically, the present invention may be applied to a system including a plurality of devices (e.g., a host computer, an interface device, an image capturing device, a web application, etc.), or may be applied to an apparatus including a single device.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-070187, filed Mar. 26, 2012 which is hereby incorporated by reference herein in its entirety.

What is claimed is:

1. An information processing apparatus comprising:
an image management unit configured to manage a multi-viewpoint image group;
an object information management unit configured to manage information about objects and relationship information indicating a relationship between the objects;
a specification unit configured to specify an object in each image of the image group by performing an object recognition process on the image based on focal length information and the information about the objects;
a determination unit configured to determine a target object based on the relationship information; and
an image generation unit configured to generate an image that contains the determined target object specified by the specification unit.

2. An information processing apparatus of claim 1, further comprising:
a cooperation unit configured to, when the information processing apparatus is connected to an external service that manages information indicating a relationship between objects, cooperate with the external service so that the relationship information managed by the object information management unit is associated with the relationship information managed by the external device.

3. An information processing apparatus of claim 2, wherein the determination unit determines the target object using the relationship information managed by the external service and obtained by the cooperation unit.

4. An information processing apparatus of claim 2, further comprising:
a context obtaining unit configured to obtain a context set for each predetermined image group in the image group, wherein
the target object is determined based on a result of evaluation of the relationship indicated by the relationship information based on the context.

5. An information processing apparatus of claim 1, further comprising:
an entering unit configured to perform an object recognition process on each image of the image group based on the information about the objects, and enter the information about the object specified by the recognition process as object information into the image management unit in association with the each image of the image group; and
a relationship information generation unit configured to generate the relationship information based on the object information.

6. An information processing apparatus of claim 5, wherein the relationship information generation unit generates the relationship information based on an occurrence frequency of an object in the image group, and a co-occurrence frequency between objects obtained from the image group.

7. An information processing apparatus of claim 1, wherein the determination unit determines a plurality of objects as the target objects, and
when there are a plurality of the target objects, the image generation unit generates an image that contains the plurality of target objects specified by the specification unit.

8. An information processing apparatus of claim 7, wherein when there are a plurality of the target objects, the image generation unit generates groups of target objects from the plurality of target objects based on the relationship information, and generates an image for each of the target object groups.

9. An information processing apparatus comprising:
an image holding unit configured to hold a multi-viewpoint image;
an object information holding unit configured to hold information about objects and relationship information indicating a relationship between the objects;
a recognition unit configured to recognize objects in the multi-viewpoint image based on the information about the objects;
a determination unit configured to determine a target object from the recognized objects based on the relationship information; and
a generation unit configured to generate a combined image in which the target object is in focus, based on the multi-viewpoint image.

10. An information processing apparatus of claim 9, wherein
the relationship information indicates a relationship between a user of the combined image and the object.

11. An information processing apparatus of claim 9, wherein
the information about the objects is information about a previously learned feature of the objects.

12. An information processing apparatus of claim 9, wherein
the relationship information includes occurrence frequencies of the objects in the multi-viewpoint image, and
the generation unit generates combined images in which the target object is in focus, based on the multi-viewpoint image, in descending order of the occurrence frequency.

13. An information processing apparatus of claim 9, wherein
when the determination unit determines a plurality of objects as the target objects, the generation unit sets a focal length based on focal lengths of the target objects and a parameter for an aperture diameter that provides a depth of field covering the plurality of target objects, and generates a combined image in which the plurality of target objects are in focus, based on the multi-viewpoint image.

14. An information processing apparatus of claim 9, further comprising:
a cooperation unit configured to, when the information processing apparatus is connected to an external service that manages the information indicating the relationship between the objects, cooperate with the external service so that the relationship information managed by the object information holding unit is associated with the relationship information managed by the external device.

15. A control method for an information processing apparatus, the method comprising the steps of:
specifying an object in each image of a multi-viewpoint image group by performing an object recognition process on the image based on focal length information and information about the object;
determining a target object based on relationship information indicating a relationship between objects, where an object information management unit manages information about the objects and the relationship information; and
generating an image that contains the determined target object specified by the specifying step.

16. A control method for an information processing apparatus, the method comprising the steps of:
recognizing objects in a multi-viewpoint image based on information about the objects;
determining a target object from the recognized objects based on relationship information indicating a relationship between the objects; and
generating a combined image in which the target object is in focus based on the multi-viewpoint image.

17. A non-transitory computer readable storage medium storing a program that causes a computer to execute a control method of claim 15.

18. A non-transitory computer readable storage medium storing a program that causes a computer to execute a control method of claim 16.

* * * * *